Figure 1:
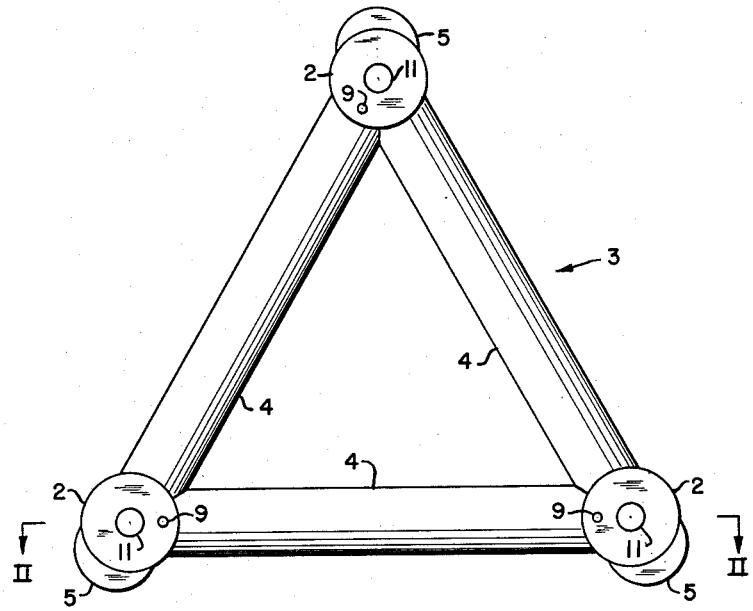

Dec. 1, 1964      C. VOS      3,159,130

FLOATING STORAGE TANK

Filed Jan. 17, 1963      3 Sheets-Sheet 1

INVENTOR:
CORNELIS VOS

BY: *[signature]*

HIS ATTORNEY

INVENTOR:
CORNELIS VOS

BY: *[signature]*

HIS ATTORNEY

United States Patent Office 3,159,130
Patented Dec. 1, 1964

3,159,130
FLOATING STORAGE TANK
Cornelis Vos, The Hague, Netherlands, assignor to Shell Oil Company, New York, N.Y., a corporation of Delaware
Filed Jan. 17, 1963, Ser. No. 252,151
Claims priority, application Netherlands, Feb. 26, 1962, 275,268
12 Claims. (Cl. 114—.5)

This invention relates to a floating tank of the displacement type for the storage of a liquid, especially oil, which has a specific gravity lower than that of a support liquid, particularly water. The tank is provided with a reservoir for the storage of oil and with trimming tanks which are integral with the reservoir and arranged on different sides of the vertical center line of the tank and which give the tank its buoyancy.

A known tank of the displacement type is described in U.S. patent specification No. 2,402,790. This tank however, has a disproportionately large section of the tank floating above the water line. Consequently the tank has a large surface area on which the waves and the wind can play freely, so that the anchoring of a large tank of this type in open water causes very great difficulties.

It is therefore the object of this invention to provide a tank which is exposed to the force of waves and wind to a much less extent and which can be constructed as a large unit, for example with a capacity of 20,000 cu. m.

To this end according to the invention, the oil storage reservoir consists of a number of storage elements which are in open communication with each other below the surface of the supporting water. At least three of these storage elements are predominantly submerged stabilizing elements arranged on different sides of the vertical center line of the tank and extend above the water line. Each of the stabilizing elements permits pressure communication between the atmosphere and the contents of the reservoir and is integral with at least one buoyancy member which preferably extends on either side of the water line. In the preferred embodiment, the stablizing elements are tubular and the buoyancy members, which may contain liquid, are inside the stabilizing elements. In many cases however, it is desirable for the stabilizing elements to be integral with buoyancy members which are situated on the outside of the stabilizing elements and which extend on either side of the water line. The latter buoyancy members need not be capable of containing liquid if other buoyancy members capable of containing liquid are provided.

Below the water line the stabilizing elements are in open communication with a tubular connecting structure which forms a portion of the reservoir and which interconnects the stabilizing elements. The tubular connecting structure may, for example, be annular or consist of a plurality of tubular members in open communication with each other at a common central junction and connected at each outer end to one of a like plurality of stabilizing elements. In the latter case the tubular members forming the connecting structure preferably are at an angle with the horizontal plane, the lowest point being at the common central junction of the tubular members where an opening is provided for communication between the support liquid and the contents of the reservoir. In the preferred embodiment, however, the connecting structure consists of three tubular members forming the legs of a triangle and communicating with each other via three stabilizing elements which are arranged at the apices of the triangle.

Figure 2:
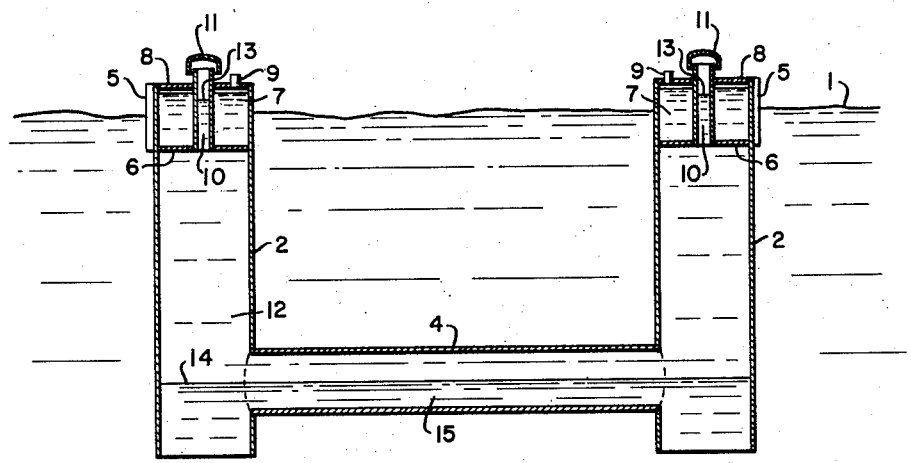
Figure 3:
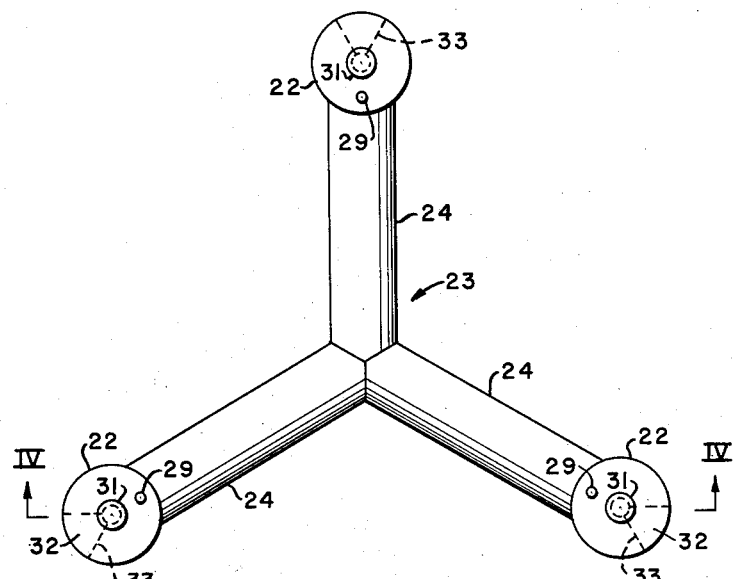
Figure 4:
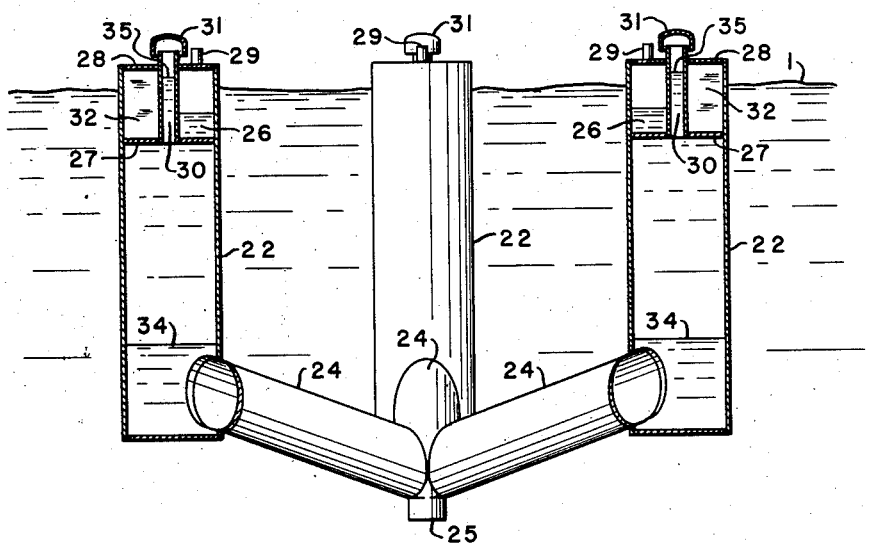
Figure 9:
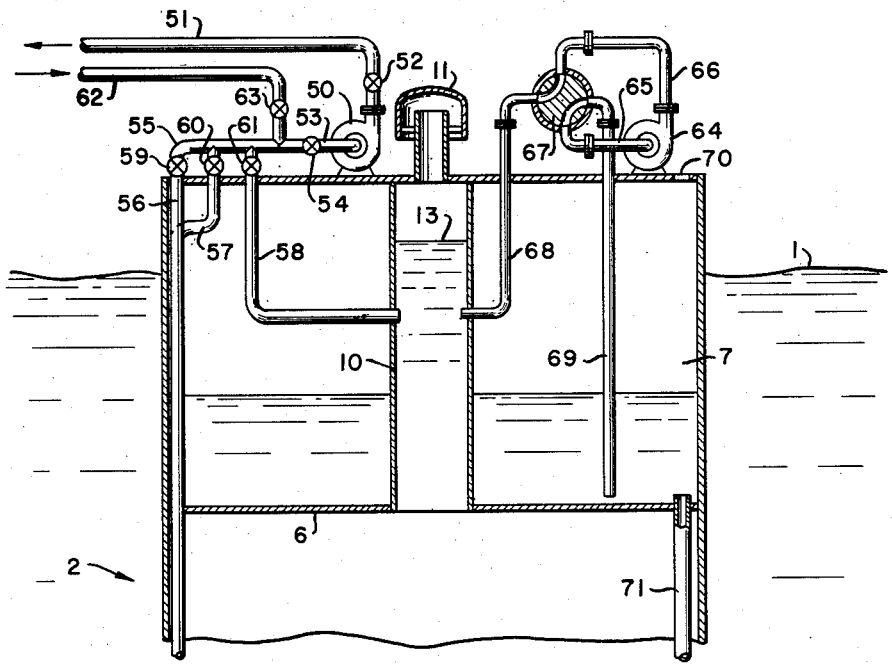

The invention will be further illustrated by means of the drawing, in which:

FIGURE 1 is a plan view of a tank according to the invention;
FIGURE 2 is a cross-section taken on the line II—II in FIGURE 1;
FIGURE 3 is a plan view of another tank according to the invention;
FIGURE 4 is a cross-section taken on the line IV—IV in FIGURE 3;
FIGURES 5–8 are diagrammatical top plan views of other tanks according to the invention; and
FIGURE 9 is a cross-section of an embodiment of the upper portion of a stabilizing element of a tank according to the invention, showing the equipment necessary for supplying and removing liquid from the tank.

Referring now to FIGURES 1 and 2 in which the water surface is denoted by numeral 1, the composite floating tank has three tubular stabilizing elements or outer tanks 2 which are in open communication with a connecting structure 3 beneath the water surface 1. The structure 3 in this embodiment consists of three tubular members 4, arranged in a triangle and lying in a horizontal plane. The stabilizing elements 2 are in vertical positions and open at the bottom below the lowest level of the tubular members 4. Float elements 5, formed, e.g., from walls enclosing air-filled chambers, are arranged on the outsides of the stabilizing elements 2 at their tops and normally extend partly above and partly below the water surface 1.

Within the upper parts of the stabilizing elements 2 are partitions 6 defining thereabove ballast or trimming chambers 7, provided with top closures 8 and coupling connections 9 for the supply and discharge of liquid from the trimming chambers 7; however, a more elaborate filling and discharge is usually preferred, e.g., as will be explained with reference to FIGURE 9. A duct 10 extends vertically through each trimming chamber 7 to a height above the top closures 8 and establishes communication between the contents of each stabilizing element 2 below the partition 6 and the atmosphere. In the illustrated embodiment the ducts 10 are at the central axes of the chambers 7, whereby the latter are annular. The projecting upper ends of the ducts 10 are covered with vented caps 11 which prevent splashing water from entering the ducts 8 from above but which have their skirts in spaced relation to the ducts to maintain the ducts in open communication with the atmosphere. The stored liquid, e.g., oil, may be introduced into the reservoir by means of the duct 10 or by any suitable coupling connection, e.g., as shown in FIGURE 9.

As shown in FIGURE 2, the reservoir formed by the tubular members 4 and the stabilizing elements 2, in so far as the space inside it is not occupied by the trimming chambers 7 and the ducts 10, is filled with oil 12 between an oil-air interface 13 and a water-oil interface 14, the water 15 having entered the tanks through the open bottoms of the stabilizing elements 2. (The level of the interfaces 13 and 14 are shown for a situation different from that described in the subsequent example.) Consequently within each stabilizing element 2 the oil 12 forms a column which at the bottom is in pressure communication with the water 15 and at the top, above the water surface 1, with the atmosphere. The pressures inside and outside the reservoir and outside the elements 2 are equal below the water-oil interface 14. Between the oil-air interface 13 and the water surface 1 the pressure within the reservoir is equal to the specific gravity of the oil times the depth below the interface 13. Between the interface 14 and the water surface 1 the pressure inside the reservoir is greater than that outside the tank, viz. (specific gravity of water-specific gravity oil) times (height above the interface 14). Hence the tank is under internal over-pressure and the interface 13 is above the water surface.

The trimming chambers 7 should be filled with a liquid, preferably oil, to such a level that the draught of the composite tank, with oil in the reservoir, is substantially the same as when the trimming chambers 7 are empty and the reservoir contains no oil. In the latter instance the interfaces 13 and 14 coincide in the form of a water-air interface at the level of the water line of the tank.

To enable the draught of the tank, when filled with oil, to be the same as the draught of an "empty" tank, i.e., one containing no oil, there should be sufficient oil storage space above the water line 1, as will be evident from the following numerical example.

Assuming a tank wherein each tubular member 4 has a length of 50 m. and a diameter of 10 m., the total internal volumes of the three tubular members would be 11,780 cu. m.

If each stabilizing element 2 has a diameter of 15 m. and the height from the water line to the bottoms of the tubular members 4 is 20 m., the combined volume of the stabilizing elements 2, the trimming chambers 7 and the ducts 10 between the water line and the bottom of the tubular members 4 is 10,600 cu. m.

Taking the specific gravity of the sea water as 1.025 and assuming that the apparent weight of the "empty" tank is 2300 metric tons, of which 500 tons are supported by the float elements 5 and 1800 tons by the buoyancy due to the empty trimming chambers 7, each chamber 7 should have, below the water line 1, a volume of 1800÷(1.025×3) cu. m.=585 cu. m.

When the tank (including the trimming chamber 7) contain oil having a specific gravity of 0.875 to a level at the bottom of the tubular members 4, the buoyancy due to the oil below the water line is (11,780+10,600)×(1.025−0.875) tons=3357 tons. If the 3×585 cu. m. of the trimming chambers 7 which imparted a buoyancy of 1800 tons when the tank was "empty" are filled with oil (this volume already being included in the 10,600 cu. m. of oil in the stabilizing elements) the said buoyancy of the trimming chambers is wholly included in the said 3357 tons. Hence a downward force of 3357−1800 tons=1557 tons (or 519 tons per stabilizing element) still has to be exerted by oil stored above the water line. (In the case described the height of the oil in the ducts 10 is (20×1.025)÷0.875−20 m.=3.43 m. above the water line.) If the small oil volume in the parts of the ducts 10 above the level of the oil in the trimming chamber is left out of account, each of the trimming chambers 7 should therefore contain, above the water line 1, 519÷0.875=594 cu. m. of oil. This quantity of oil extends to a height of 3.36 m. above the water line. The maximum amount of oil in the tank is then (11,780+10,600+1557) cu. m. or approximately 21,800 metric tons.

From this numerical example it will be clear that when designing a tank according to the invention the specific gravities of the water and the oil should be taken into account, i.e., the volume for oil storage above the water line in the trimming chambers 7 and in the stabilizing elements 2 should increase with an increasing difference in the said specific gravities. If the difference between the specific gravities is very small the space above the water line need not be used for the storage of oil. It will also be clear that when the trimming chambers 7 extend on either side of the water line the floating elements 5 may in certain cases be omitted. It is understood that the trimming chambers 7 may, if desired, be ballasted with water instead of with oil although this would reduce the useful capacity of the tank.

The tank shown in FIGURES 3 and 4 has three vertical tubular stabilizing elements 22 which are closed at the bottom and arranged in a triangular configuration. Below the water line each of the stabilizing elements 22 is in open communication with an outer end of one of three tubular members 24 which form a connecting structure 23. The members 24 are in open communication with each other at a common central junction. The tubular members 24 are so inclined to the horizontal that the lowest point is at the junction of the three members 24. At the bottom of this junction is a short tube 25, which is open at the bottom and communicates with the members 24, to establish communication between the contents of the tank and the water outside the tank.

Trimming chambers 26 are defined in the upper parts of the tubular elements 22 by partitions 27 and these chambers are closed at the top by walls 28 fitted with coupling connectors 29. A duct 30 extends through each chamber 26 to a height above the closure 28, e.g., at the centers of the chambers, to interconnect the space beneath partition 27 to the atmosphere. These ducts carry vented caps 31. In this embodiment, the sealed, air-filled float chambers 32 are situated within the stabilizing elements 22 and are defined by radial partitions 33. The chambers 26 can thus be filled with oil or other liquid while the chambers 32 cannot be so filled. The water-oil and oil-air interfaces are respectively denoted by 34 and 35.

Figure 6:
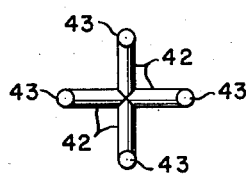
Figure 7:
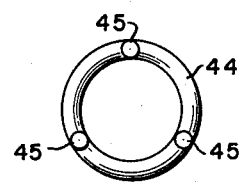
Figure 5:
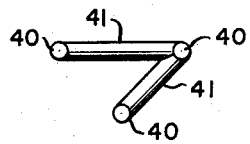

The tank shown in FIGURE 5 is provided with three vertical stabilizing elements 40 connected at their lower ends to the ends of two horizontal communicating tubular members 41 which together form an acute angle. The tank shown in FIGURE 6 is provided with four intercommunicating tubular members 42 which are rigidly interconnected at a central point and are connected at their opposite ends to the bottoms of four upright stabilizing elements 43 with which they communicate. The tank shown in FIGURE 7 is provided with a hollow ring 44 to which are connected the lower ends of three upright stabilizing elements 45 with equal circumferential interspaces.

Figure 8:
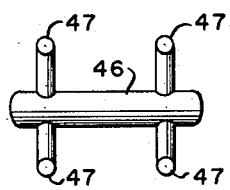

The tank shown in FIGURE 8 is provided with a single horizontal tubular member 46 to which are connected the lower ends of four stabilizing elements 47, two being connected near each end. In order to make the tank stable, the stabilizing elements should be arranged symmetrically on different sides of the vertical central plane through the axis of the member 46. For this purpose, at least the lower ends of the elements 47 are inclined divergently upwards from the said plane, so that the parts situated above the water line extend sufficiently far in a lateral direction to provide the tank with the necessary stability.

It will be understood that many other embodiments of tanks according to the invention are possible. Thus, for example, the star-shaped structural tubular element 23 shown in FIGURE 3, may be combined with the annular structural tubular element 44 of FIGURE 7, by providing both radiating and peripheral connecting tubular lower members.

As can be seen from the foregoing description, the discharging of oil from a tank according to the invention, and to a lesser extent, also the filling, calls for special equipment since if the oil is pumped out of one of the stabilizing elements, the oil remains behind in the other stabilizing elements of the tank. Hence, a separate suction line for each stabilizing element must be provided. In order to make the discharge of oil from the floating tank as simple as possible, the arrangement as shown in FIGURE 8 may be used. Then the various suction lines may be passed to a single pump unit mounted on one of the stabilizing elements.

Referring to FIGURE 9 which is a cross section of the upper portion of a stabilizing element according to the embodiment of FIGURE 1, a pump 50 is shown for discharging the oil from the tank. The delivery line 51 of this pump 50 leads via a valve 52 to a connection (not shown) to which a filling line of a tanker can be connected. The suction line 53 of the pump 50 leads via a valve 54 to a collecting line 55 to which are connected lines 56, 57 and 58 with valves 59, 60 and 61 respectively. Line 58 issues near the water line into the duct 7 of the stabilizing element 2 shown, while lines 56 and 57 lead to corresponding points of the other stabilizing elements of the same tank. This enables the entire tank to be discharged by means of one or more pumps 50 arranged on a single stabilizing element. A supply line 62 with a valve 63 is also connected to the collecting line 55, which supply line can be connected to any convenient oil supply, for example, an oil well in the vicinity of the tank. The oil supplied can be distributed among the various stabilizing elements through the collecting line 55 by adjusting the valves 59–61, so that during filling the oil-air interfaces 13 and the water-oil interfaces 14 can rise and respectively at the same rate in all stabilizing elements 2.

In order to keep the floating tank as horizontal as possible during loading and discharging and to keep the draught of the floating tank substantially constant, suitable conduits must be provided for connecting the trimming chambers together and for the supply and discharge of liquid from these chambers. The conduits are connected to a pump in such a manner as to enable oil to be pumped from the reservoir to a trimming chamber and vice versa. Referring again to FIGURE 9 a pump 64 is shown which has its suction line 65 and the delivery line 66 connected to two opposite connections of a four-way valve 67. The two other connections of the four-way valves 67 are respectively connected to a line 68 which issues into the duct 10 near the level of the water line 1 and a line 69 which issues near the bottom of the trimming chamber 7. In the first position of the four-way valve 67 shown in the drawing, the pump 64 can pump oil from the trimming chamber 7 which is provided with a vent opening 70. In order to keep water from entering the trimming chambers through the opening 70, a cap similar to cap 11 may be provided or the opening 70 may be plugged when the pump 64 is not in use. When the four-way valve 67 is rotated through 90° to its second position, the chamber 7 can be filled with oil withdrawn from the duct 10. A pipe line 71 issuing near the bottom of the chamber 7 leads to the trimming chambers in the other stabilizing elements 2 and is connected to these trimming chambers in a similar manner thus enabling the oil level in all float elements to be uniformly changed. Although not shown in the drawings, it is understood that preferably the pipe line 71 leads to the trimming chambers in the other stabilizing elements through the conduits interconnecting the stabilizing members.

In order to maintain an equal draught when the tank is loaded, oil should be gradually pumped into the trimming chambers 7. If desired this may be automatically controlled by means of floats which are floating on the water-oil interface 14 and/or on the oil-air interface 13. Conversely oil should be gradually pumped from the trimming chambers 7 when the tank is discharged.

Due to the relatively simple form of the various elements from which a tank according to the invention is made up, the various elements may be towed to and assembled at the site where the tank is to be used. When the weather is favorable, the entire tank may be towed over shorter distances. Once the assembled tank is at its proper location, it is understood that suitable anchoring means should be provided. If desired, the tank may also be provided with means enabling a ship to be moored to the tank.

Obviously, various modifications of the present invention are possible in the light of the above teachings. It is therefore to be understood that the invention is not limited to the particular form illustrated but is capable of embodiment in other forms without departing from the spirit and scope of the appended claims.

I claim as my invention:

1. A floating tank of the displacement type for the storage of a first liquid having a specific gravity lower than that of the supporting liquid comprising:

a storage reservoir for storing said first liquid, said storage reservoir having at its lowest level at least one opening for direct communication between the interior of said storage reservoir and the supporting liquid; said storage reservoir consisting of at least three upwardly extending tubular elements arranged on different sides of the vertical center line of said tank, and laterally-extending tubular conduit means interconnecting the lower submerged portions of said upwardly extending elements and in open communication therewith, each of said upwardly extending elements having an opening at its upper end which permits pressure communication between the atmosphere and the contents of the reservoir;

a separate trimming chamber integral with each of said upwardly extending elements; and means for supplying and discharging liquid from said reservoir via said upwardly extending elements.

2. A floating storage tank as claimed in claim 1 wherein said means for supplying and discharging liquid from said reservoir comprises pump means mounted on the top of one of said upwardly extending elements and pipe lines extending between said pump means and each of said upwardly extending elements, said pipe lines opening into each of said upwardly extending elements near its upper end.

3. The floating storage tank of claim 1 wherein said trimming chambers are inside of said upwardly extending elements at the upper ends thereof; and means for supplying and discharging liquid from said trimming chambers.

4. The floating storage tank of claim 3 including a float element fixed to outer surface of each of said upwardly extending elements at its upper end.

5. A floating storage tank as claimed in claim 3 including means interconnecting said trimming tanks for maintaining the liquid in each of said trimming tanks at the same level.

6. A floating storage tank as claimed in claim 3 wherein said means for supplying and discharging liquid from said trimming chambers comprises: a pump mounted on the top of one of said upwardly extending elements; a four-way valve; said pump having its input and output lines connected to opposite connections of said four-way valve; a first and a second pipe, said first pipe having one end thereof connected to one of the remaining connections of said four-way valve and its other end opening into said one of said upwardly extending elements near its upper end, said second pipe having one end thereof connected to the remaining connection of said four-way valve and extending into the trimming chamber in said one of said upwardly extending elements, said second pipe opening into said last mentioned trimming chamber near its lower end.

7. The floating tank of claim 6 including means interconnecting said trimming tanks for maintaining the liquid in each of said trimming tanks at the same level.

8. The floating storage tank of claim 3 wherein each of said upwardly extending elements is open at the bottom and said conduit means interconnecting the lower portions of said upwardly extending elements comprises three tubular conduits communicating with each other and arranged in a triangle which is oriented in a horizontal plane, one of said upwardly extending elements being connected to said conduit means at each of the corners of the triangle.

9. The floating storage tank of claim 3 wherein said conduit means interconnecting the lower portions of said upwardly extending elements comprises a plurality of tubular conduits communicating with each other at a common central junction to which one end of each of said tubular conduits is connected, one of said upwardly extending elements being connected to the opposite end of each of said tubular conduits.

10. The floating storage tank of claim 9 wherein said means interconnecting the lower portions of said upwardly extending elements comprises three tubular conduits;

each of said three tubular conduits forming an angle with the horizontal plane with the lowest portion of each of said three tubular conduits being at the common junction; said common junction having an opening for communication between the support liquid and the contents of the reservoir.

11. A floating storage tank as claimed in claim 3 wherein said conduit means interconnecting the lower portions of said upwardly extending elements is annular.

12. A floating storage tank as claimed in claim 3 wherein said reservoir has three upwardly extending elements and said tubular conduit means interconnecting the lower portions of said upwardly extending elements consists of two tubular members communicating with each other.

References Cited in the file of this patent
UNITED STATES PATENTS

| | | |
|---|---|---|
| 2,631,558 | Harris | Mar. 17, 1953 |
| 2,887,977 | Piry | May 26, 1959 |
| 2,924,350 | Greer | Feb. 9, 1960 |
| 3,076,205 | Schultz | Feb. 5, 1963 |
| 3,082,608 | Daniell | Mar. 26, 1963 |
| 3,086,368 | Popper | Apr. 23, 1963 |